(12) United States Patent
Webb et al.

(10) Patent No.: US 8,175,147 B1
(45) Date of Patent: May 8, 2012

(54) VIDEO CODING RATE CONTROL

(75) Inventors: Jennifer L. H. Webb, Dallas, TX (US); Sreenivas Kothandaraman, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1504 days.

(21) Appl. No.: 11/462,096

(22) Filed: Aug. 3, 2006

Related U.S. Application Data

(60) Provisional application No. 60/706,393, filed on Aug. 8, 2005.

(51) Int. Cl.
- *H04N 7/12* (2006.01)
- *H04N 11/02* (2006.01)
- *H04N 11/04* (2006.01)
- *H04N 7/00* (2011.01)
- *H04N 11/00* (2006.01)

(52) U.S. Cl. ......... 375/240.03; 375/240.04; 375/240.06; 375/240.16; 348/497

(58) Field of Classification Search .................. 375/240
See application file for complete search history.

(56) References Cited

U.S. PATENT DOCUMENTS

| | | | | |
|---|---|---|---|---|
| 5,652,627 A | * | 7/1997 | Allen | 348/497 |
| 5,751,358 A | * | 5/1998 | Suzuki et al. | 375/240.04 |
| 5,847,761 A | * | 12/1998 | Uz et al. | 375/240.06 |
| 2002/0163966 A1 | * | 11/2002 | Ramaswamy | 375/240.03 |
| 2004/0146108 A1 | * | 7/2004 | Hsia | 375/240.16 |

* cited by examiner

*Primary Examiner* — Christopher S Kelley
*Assistant Examiner* — Hee-Yong Kim
(74) *Attorney, Agent, or Firm* — Mirna Abyad; W. James Brady; Frederick James Brady

(57) ABSTRACT

Video encoding (such as H.263, MPEG-4, H.264/AVC) modifies TMN5-type rate control frame skipping and quantization parameter updating according to buffer fullness levels with I-frame initial quantization parameter values depend upon quantization parameter value of prior P-frames but also has within I-frame prediction and parameter increase to avoid excessive bits. And variable input frame rate is accommodated by adjusting buffer fullness measures. The quantization also applies to image compression.

3 Claims, 7 Drawing Sheets

Figure 1a for QPI vary
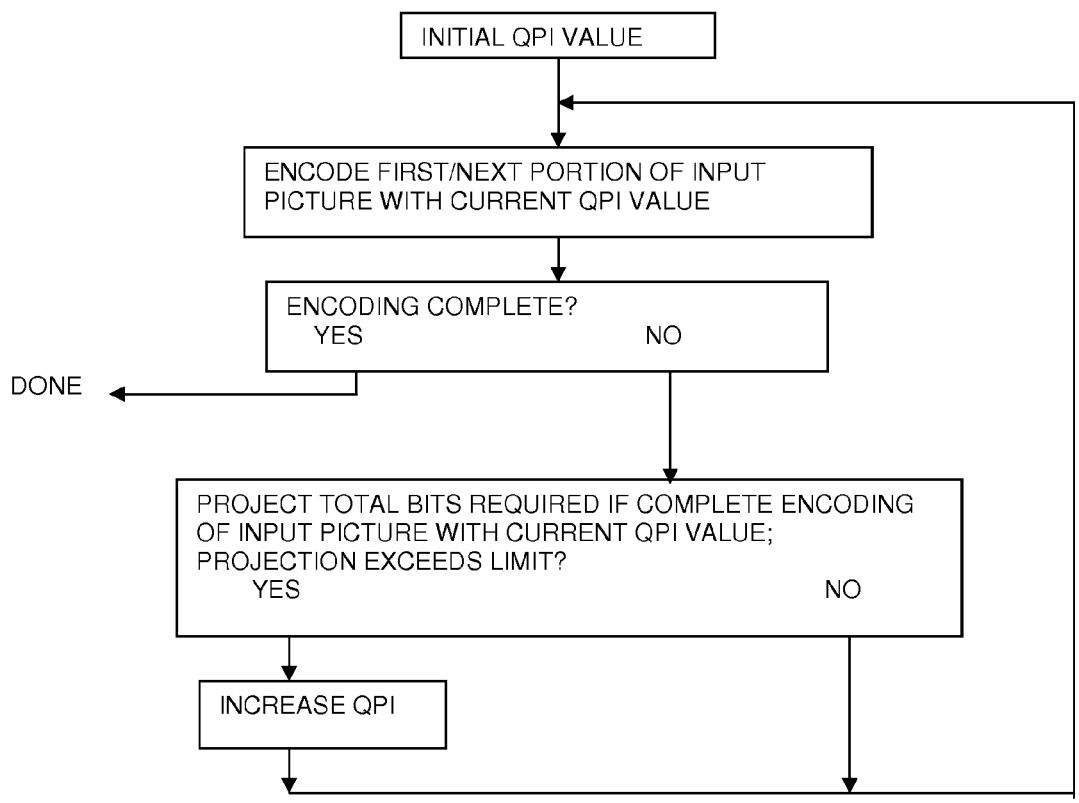

Figure 1b for variable frame rate
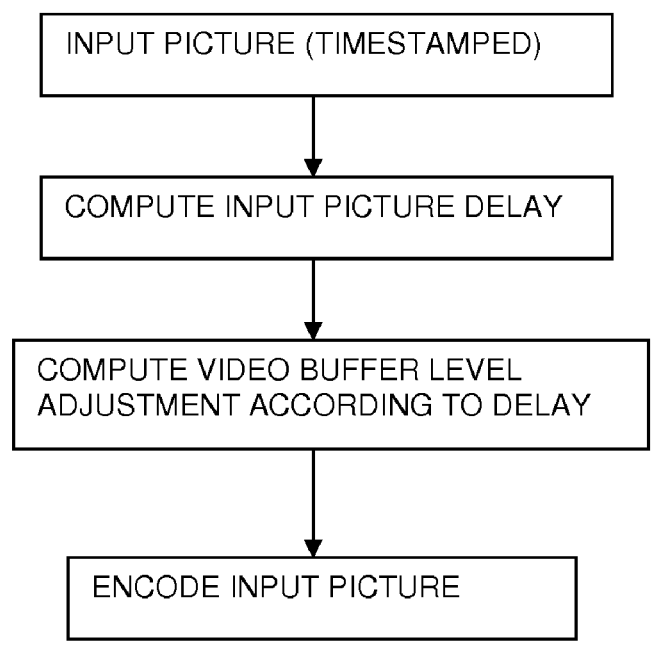

Figure 2a (prior art)  encoding
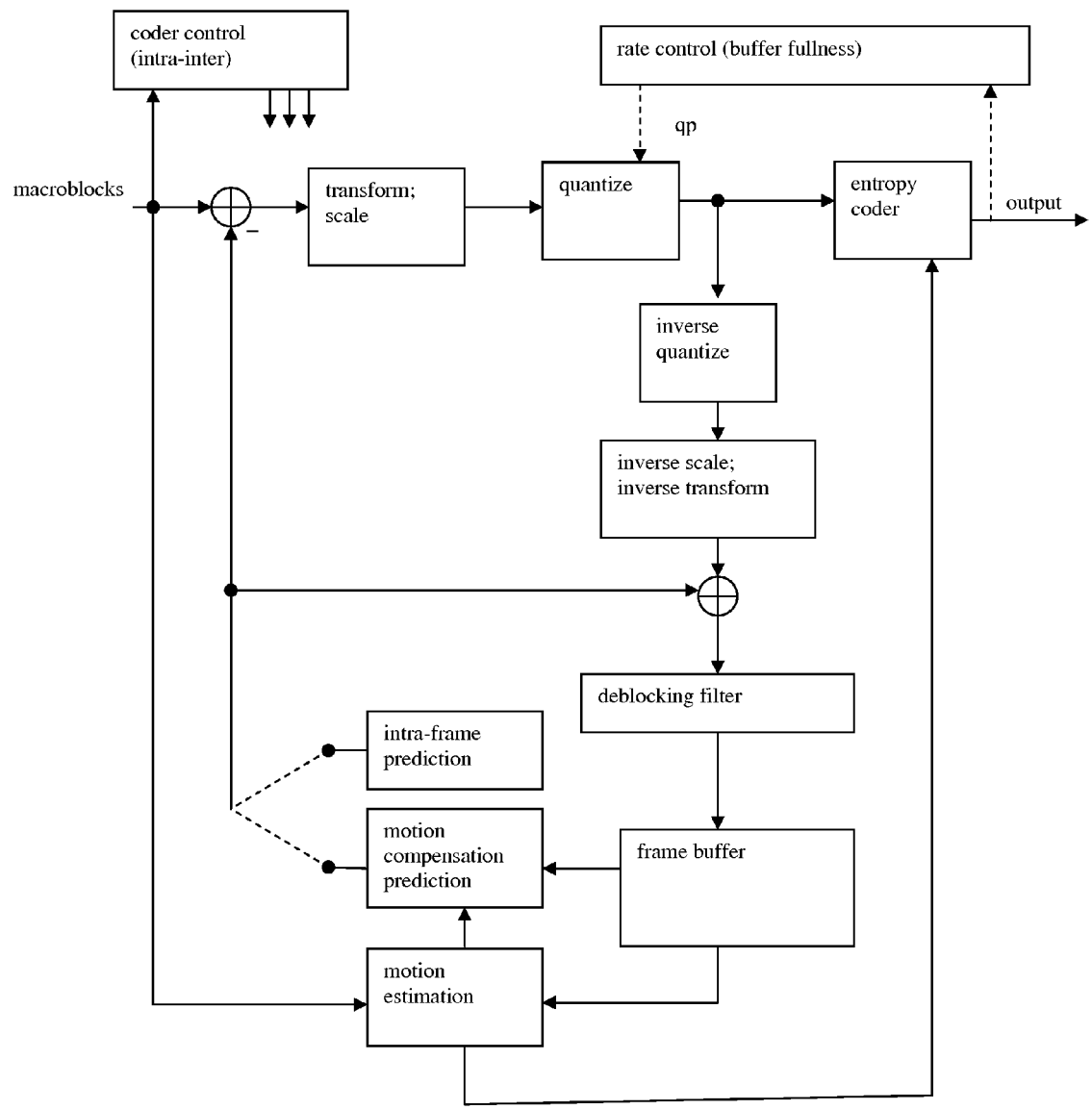

Figure 2b (prior art)   decoding
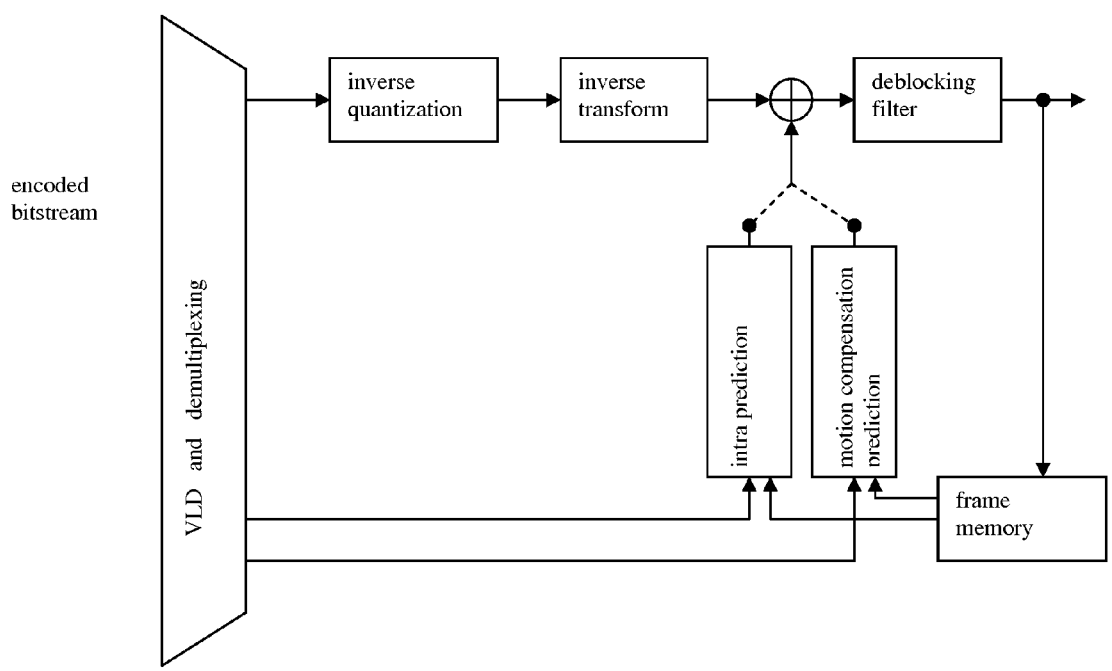

Figure 3a (prior art)   processor
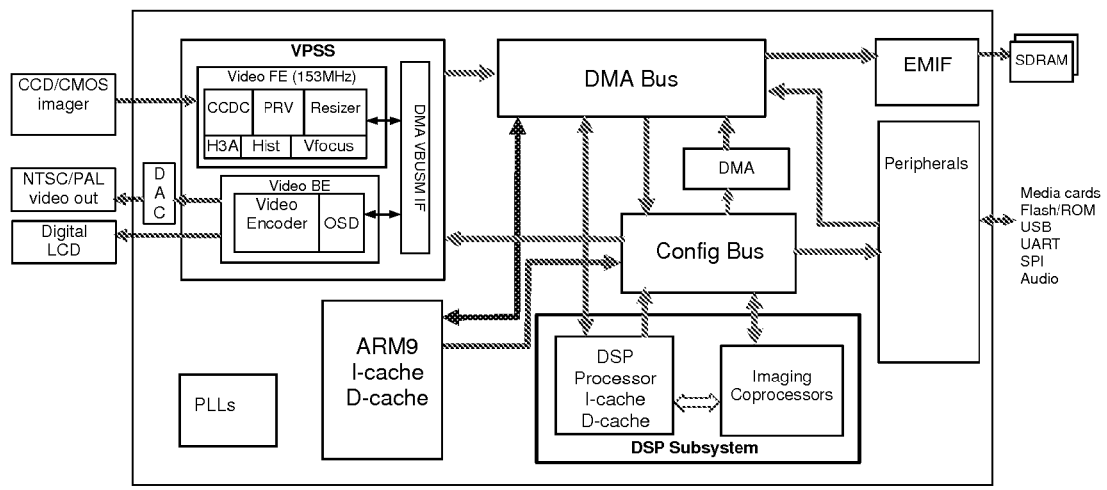

VIDEO CODING RATE CONTROL

CROSS-REFERENCE TO RELATED APPLICATIONS

The present application claims priority from provisional patent application No. 60/706,393, filed Aug. 8, 2005. Co-assigned copending patent application Ser. No. 11/218,407, filed Sep. 1, 2005 (Lafon and Webb), discloses related subject matter.

BACKGROUND

The present invention relates to digital video signal processing, and more particularly to devices and methods for video coding.

There are multiple applications for digital video communication and storage, and multiple international standards have been and are continuing to be developed. Low bit rate communications, such as, video telephony and conferencing, led to the H.261 standard with bit rates as multiples of 64 kbps, and the MPEG-1 standard provides picture quality comparable to that of VHS videotape. Further developments led to better compression performance in video coding standards such as MPEG-2, MPEG-4, H.263, and H.264/AVC. At the core of all of these standards is the hybrid video coding technique of block motion compensation plus transform coding. Block motion compensation is used to remove temporal redundancy between successive pictures (frames or top/bottom fields), whereas transform coding is used to remove spatial redundancy within each picture. FIGS. 2a-2b illustrate H.264/AVC functions which include a deblocking filter within the motion compensation loop to limit artifacts created at block edges.

Traditional block motion compensation schemes basically assume that between successive frames an object in a scene undergoes a displacement in the x- and y-directions and these displacements define the components of a motion vector. Thus an object in one frame can be predicted from the object in a prior frame by using the object's motion vector. Block motion compensation simply partitions a frame into blocks and treats each block as an object and then finds (motion estimation) a motion vector which locates the most-similar block in the prior frame. The most-similar block is a prediction of the current block and this prediction block can be encoded simply by the motion vector. This simple block motion assumption works out in a satisfactory fashion in most cases in practice and can be easily extended for use with interlaced fields. Consequently, block motion compensation has become the most widely used technique for temporal redundancy removal in video coding standards.

Typically, a frame is partitioned into macroblocks where each macroblock contains four 8×8 luminance (Y) blocks plus two 8×8 chrominance (Cb and Cr or U and V) blocks, although other block sizes, such as 4×4, are also used in H.264/AVC. The frame can be encoded either with motion compensation or without motion compensation. An I-frame is encoded without motion compensation ("intra-coded") by simply applying the transform, quantization, and variable-length coding to each macroblock (or prediction error block using adjacent-pixel prediction). In contrast, a P-frame is encoded ("inter-coded") with motion compensation and a macroblock is encoded by its motion vector plus the transform, quantization, and variable-length coding of its residual block (prediction error block from the motion vector located block). The transform of a block converts the pixel values of a block from the spatial domain into a frequency domain; this takes advantage of decorrelation and energy compaction of transforms such as the two-dimensional discrete cosine transform (DCT) to make the quantization more effective. For example, in MPEG-2 and H.263, 8×8 blocks of DCT-coefficients are quantized, scanned into a one-dimensional sequence, and the sequence coded by using variable length coding. H.264/AVC uses an integer approximation to a 4×4 DCT.

The rate-control unit in FIG. 2a is responsible for generating the quantization parameter by adapting to a target transmission bit-rate in view of the current fullness of the output buffer; a larger quantization parameter implies more vanishing and/or smaller quantized transform coefficients which means fewer and/or shorter variable-length codewords and consequent lower bit rates and smaller files. Of course, a larger quantization parameter also means more distortion in the frame decoded after transmission. Typically, the quantization step sizes vary linearly or exponentially with the quantization parameter (QP); e.g., quantization step size could be proportional to QP or to $2^{QP/6}$. Also, the predictive power of motion compensation generally leads to many more bits used encoding an I-frame than encoding a P-frame with comparable distortion.

Further, some low-rate applications may have an input at the typical 30 frames per second but only output 10 or 15 encoded frames per second. Thus input frames are skipped to adapt to the output encoded frame rate.

Telenor (Norwegian telecom) made an encoding implementation for H.263, denoted Test Model Near-term 5 or TMN5, publicly available; and this implementation has been widely adopted including use for MPEG-4. The TMN5 rate control includes the function updateQuantizer( ) which generates a new quantization parameter (qp or QP) value based on the bits used up to the current macroblock in a frame and the bits used for encoding the prior frame. The function should be called at the beginning of each row of macroblocks (i.e., each slice), but it can be called for any macroblock.

However, the TMN5 encoder has problems including being designed for low-delay, low-bit-rate applications and using a fixed quantization parameter for I-frames and only varying the quantization parameter for P-frames.

For rate control methods using a fixed quantization parameter for I-frames (QPI), when the frame generates too many bits, the encoder may be forced to abort the frame to avoid either overflowing the video output buffer (vbv) or exceeding limits on instantaneous bit rate. Also, several frames may need to be skipped afterwards, to reduce delay for low-delay applications. This is particularly a problem for the first I-frame of a sequence when the initialization value for QPI is set too low.

Another problem is that some encoder systems produce a variable frame rate. For instance, an encoder may skip a frame, due to insufficient MIPS, and some sensors change the integration time (exposure) based on the light available. These sensors may have a target frame rate to feed the encoder, but the actual capture time may be delayed, particularly in poor lighting conditions, or the capture may occur early. Rate control methods generally assume a fixed input frame rate, but with a variable frame rate, the buffer level may be different than what is assumed for fixed frame rate. Without compensating for these variations, the encoder may overflow the vbv buffer, or abort a frame unnecessarily, due to incorrect modeling of the vbv buffer.

SUMMARY OF THE INVENTION

The present invention provides video encoding rate control which allows quantization parameter increase but not decrease during intra picture encoding and/or with variable rate for input pictures, adjusting video buffer level according to (positive or negative) delay.

BRIEF DESCRIPTION OF THE DRAWINGS

FIGS. 1a-1d are flowcharts and adaptation graphs.
FIGS. 2a-2b are functional block diagrams of block-based motion compensation coding.
FIGS. 3a-3b show a processor and network connections.

DESCRIPTION OF THE PREFERRED EMBODIMENTS

1. Overview

Figure 1C:
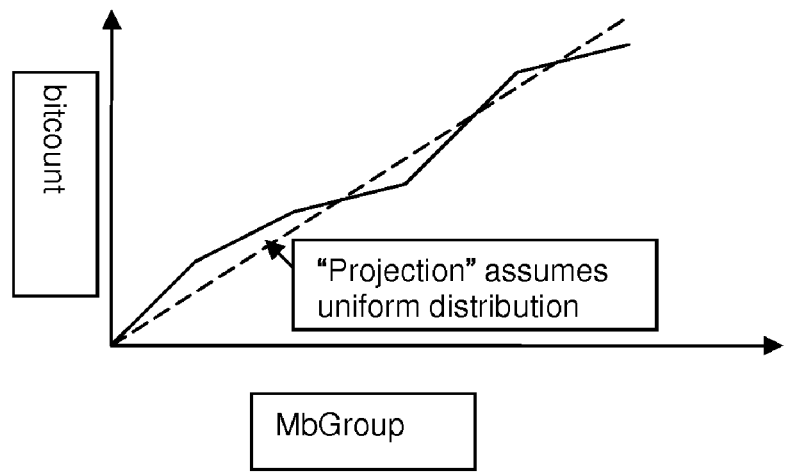

Preferred embodiment rate control methods extend the Telenor TMN5 type rate control for video encoding with more accurate adjustments of quantization parameter values and/or input picture delay (positive or negative). In particular, first preferred embodiment rate control methods increase the quantization parameter for an I-frame (QPI) monotonically within the frame, but only for the purpose of avoiding an excessive (not insufficient) frame bit size. This QPI control may apply in conjunction with the rate control described in cross-referenced co-assigned, copending Appl No. 11/218,407, which uses a constant QPI within an I-frame, yet varies QPI from I-frame to I-frame, to maintain consistency with the P-frame quality (that is, QPI and QP for P-frames are adjusted to give comparable quantization levels). In contrast, methods with constant QPI compensate for any shortfall or excess bits used for an I-frame with adjustment to QP for subsequent P-frames.

Second preferred embodiment rate control methods apply to variable input frame rate methods and adjust the video buffer level (vbv_level) according to delay (positive or negative) from skipped frames. Known variable frame rate methods may support added frame skips, assuming an integer number of frames are skipped, but second preferred embodiment methods also support sensors that may vary the capture time by fractional frame time increments, with the capture occurring either early or late.

Third preferred embodiments use both the first preferred embodiment QPI increase within an I-frame to limit frame bit size and the second preferred embodiment vbv level adjustments.

The preferred embodiments have advantages. For example, the use a fixed QPI for I-frames, when possible, gives consistent visual quality; but if the cumulative bitcount part way through the I-frame indicates a risk that a frame limit may be exceeded, then QPI is increased (e.g., by 2 for MPEG-4), but then remains constant unless there is still a risk of an excessive bit count after the next macroblock or group of macroblocks is coded. By using a fixed increment, the change is gradual.

In contrast, the I-frame quality may vary more for a method such as TM5. For instance, with an image of a face, QPI may be low for the background (high quality), but when the detail of the face is coded, the higher buffer level will increase QPI (and thus lower quality in the face), and then lower QPI again when there is less detail in the shoulder region. Also, the bit target for the I-frame is based on the bit usage for the previous I-frame, but if there is a scene change, this target may result in a sudden change in quality. Note that TM5 also assumes a regular group of pictures (GOP) structure with periodic I-frames. Preferred embodiment methods support forced I-frames at irregular intervals; such as for error-prone environments when the decoder signals a request for an I-frame via H.245 or when the encoder detects a scene change.

For variable input frame rate, preferred embodiment methods allow the encoder to run the sensor as fast as possible in low light, and still maintain a target bit rate.

Figure 3B:
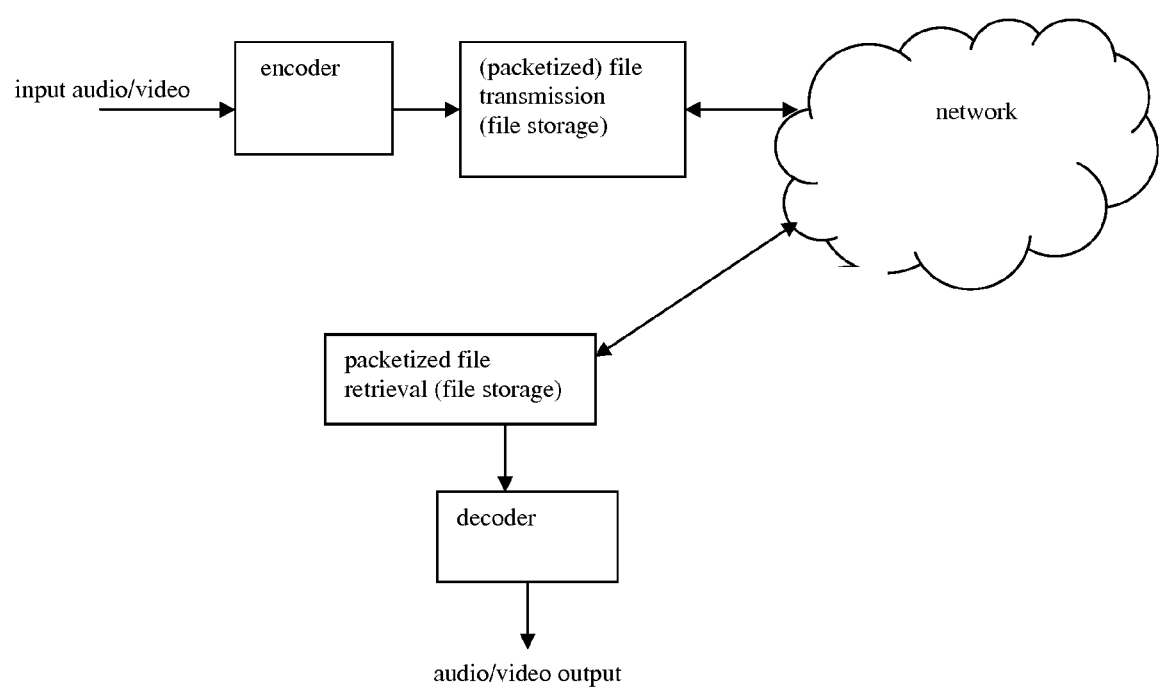

Preferred embodiment systems (e.g., video cellphones, PDAs, digital cameras, etc.) perform preferred embodiment methods with any of several types of hardware, such as digital signal processors (DSPs), general purpose programmable processors, application specific circuits, or systems on a chip (SoC) such as multicore processor arrays or combinations such as a DSP and a RISC processor together with various specialized programmable accelerators (e.g., FIG. 3a with CCD controller CCDC, preview engine PRV, etc.). A stored program in an onboard or external (flash EEP) ROM or FRAM could implement the signal processing methods. Analog-to-digital and digital-to-analog converters can provide coupling to the analog world; modulators and demodulators (plus antennas for air interfaces such as for video on cellphones) can provide coupling for transmission waveforms; and packetizers can provide formats for transmission over networks such as the Internet as illustrated in FIG. 3b.

2. General Rate Control

First consider the operation of the TMN5 rate control with frames input at a rate of refframerate frames per second (fps), typically equal to 30, and encoded frames output at a frame rate of framerate fps and a bit rate of bit_rate bits per second. If refframerate is greater than framerate, then input frames are periodically skipped to achieve the correct output frame rate. For example, input at 30 fps and output at 10 fps would imply skipping on the average two frames after each frame encoding.

The output bit target is B_target bits per encoded output frame where B_target=bit_rate/framerate. Analogously, the quantity bits_per_input_frame=bit_rate/refframerate is the number of output bits allocated per input frame; this would be an average taking into account the input frame skips due to differing input and output frame rates. After encoding a frame, the actual number of bits used, bits, is added to the buffer total, Vbv_level, and the number of bits allocated to be sent out of the buffer, bits_per_input_frame, is subtracted from the buffer total:

---

Vbv_level = Vbv_level + bits;   //add bits forcurrent picture
Vbv_level = Vbv_level – bits_per_input_frame;   //bits sent out

---

Then the encoder moves to the next frame to be encoded by incrementing frameskip input frames;

---

```
frameskip = 1;
while (vbv_level >= bits_per_input_frame){
    vbv_level –= bits_per_input_frame;
    frameskip += 1;
}
```

--- so the actual output frame rate depends upon how closely the encoded output frame bits matches the target B_target.

During encoding a frame, the function UpdateQuantizer adjusts the quantization parameter of a macroblock in order to make the number of bits being used for encoding the frame approximately B_target bits. Typically, the quantization parameter is adjusted at the beginning of each slice or row of macroblocks.

In more detail, UpdateQuantizer applies the following four main steps to update of the P-frame quantizer parameter, QP:

$$\text{projected} = mb*(B\_target/(mb\_width*mb\_height)) \quad (1);$$

where mb is the number of the current macroblock, mb_height and mb_width are the number of rows and columns of macroblocks in the frame. Thus projected is simply B_target multiplied by the fraction of macroblocks already encoded, and consequently, it is just the targeted number of bits to have already been added to the output buffer due to the already-encoded macroblocks.

$$\text{discrepancy} = (\text{bitcount} - \text{projected}) \quad (2);$$

where bitcount is the actual number of bits used encoding the already-encoded macroblocks; thus discrepancy may be either positive or negative and measures discrepancy between the actual and projected number of bits used for the already-encoded macroblocks.

$$\text{local\_adj} = 12*\text{discrepancy}/\text{bit\_rate} \quad (3);$$

The quantity local_adj will be part of a scale factor in the next step for adapting the quantization parameter, QP, to the number of bits being used.

$$\text{newQP} = (int)(QP\_mean*(1+\text{global\_adj}+\text{local\_adj}) + 0.5) \quad (4);$$

and newQP updates QP during P-frame encoding. QP_mean is the average QP for the prior encoded frame and global_adj is an adjustment due to the final bit discrepancy of the prior encoded frame: global_adj=(B_prev−B_target)/(2*B_target) where B_prev is the number of bits used for the prior encoded frame and is updated prior to encoding the current frame by:

```
void UpdateRateControl(int bits)
{
B_prey=(float)bits;
}
```

Note that TMN5 only adjusts the quantization parameter during P-frame encoding, whereas I-frame encoding uses a fixed quantization parameter, such as QPI=16.

The cross-referenced co-assigned patent application methods are analogous to the TMN5 methods in that after encoding a frame, first the actual number of bits used, bits, increments the buffer content, vbv_level, and the number of output bits allocated for an input frame, bits_per_input_frame, decrements vbv_level. Next, the number of input frames to skip is computed. Then the next frame to be encoded is processed with the quantization parameter adapting with both global_adj and local_adj. But these methods include target levels of output buffer fullness in order to (i) modify the input frame skipping and (ii) modify the global_adj part of the quantization parameter updating.

In particular, define two output buffer fullness levels:

```
vbv_maxlevel = bits_per_input_frame * 3;    // 3 pics MAX
vbv_uselevel = bits_per_input_frame * 2;    // 2 pic typical
```

Since the bit rate may be very high, the buffer fullness levels also include limiters: limit vbv_maxlevel to one half of the buffer size and limit vbv_uselevel to one quarter of the buffer size.

First, when the buffer fullness exceeds vbv_maxlevel, skip extra input frame(s) by adjusting frameskip (the frame number increment to the next input frame to be encoded). Indeed, let the chosen_skip control parameter denote the targeted number of input frames to skip: chosen_skip=refframerate/framerate−1.

Then evaluate total frameskip by

```
frameskip = 1;
i = chosen_skip;        //user required skip (target)
while( i-- > 1 ) {
    Vbv_level = Vbv_level - bits_per_input_frame;
                        //count skipped picture budget
    frameskip = frameskip + 1;       //skip next
}
//skip extra picture if high level fullness occurs.
while( Vbv_level > vbv_maxlevel ) {
    Vbv_level = Vbv_level - bits_per_input_frame;
    frameskip = frameskip + 1;
}
```

Also adjust vbv_level in case of underflow (i.e., don't count non-existent data):

```
if ( vbv_level < Arg_buffer_backlog_limit ) {
                       //underflowed don't count
    vbv_level = Arg_buffer_backlog_limit;   // missing data
}
```

Typically, Arg_buffer_backlog_limit=0, and this indicates that the buffer count cannot have a negative number of bits when the number of actual bits, so far, is below the channel bit rate. However, in some file-based or streaming systems with added buffering, a negative value for vbv_level buffer level is allowed. Negative Arg_buffer_backlog_limit indicates that if the actual bit rate is below the channel rate, then a limited number of unused bits can be allocated to future frames.

Second, for the quantization parameter update, include a convergence to the buffer fullness level vbv_uselevel using the variable vbv_converge to help adjust the quantization parameter. Compensation for the discrepancy between the current buffer level and the target vbv_uselevel is spread over time (a one second window, for example) and therefore vbv_converge actually is a convergence factor:

```
vbv_converge = 0;
if ( Vbv_level > vbv_uselevel ) {     //getting high
    vbv_converge = Vbv_level>>3;      //convergency factor
    vbv_converge = mmin( vbv_converge, B_target );   //stability
}
if(Vbv_level < bits_per_input_frame) {   //getting low
    vbv_converge = - bits/2;     //convergency factor
    EncState_QUANT -= (bits < B_target);
}
if( (Vbv_level + bits) > vbv_maxlevel ) {
    EncState_QUANT++;
}
//leave latest B_prev value from latest P picture
if (EncState_picture_coding_type != PCT_INTRA)
    UpdateRateControl(bits + vbv_converge);
```

Thus before encoding the current frame, if (Vbv_level+bits) >vbv_uselevel, increment the variable EncState_QUANT; if Vbv_level<bits_per_input_frame, decrement EncState_QUANT; and when the current frame is to be a P-frame, update B_prev to bits+vbv_converge rather than just to bits (the number of bits used to encode the prior frame). Consequently, global_adj=(B_prev−B_target)/(2*B_target) will be larger when Vbv_level>vbv_uselevel and smaller when Vbv_level<BitPerFrame. Thus the quantization parameter updating:

$$\text{newQP} = (int)(QP\_mean*(1+\text{global\_adj}+\text{local\_adj}) + 0.5);$$

will give correspondingly larger or smaller updates than without the preferred embodiment vbv_converge term.

The EncState_QUANT variable is the value of the quantization parameter at the end of encoding the prior frame, and it is used for initialization. Further, EncState_QUANT is constrained to a user-defined quantization parameter range:

EncState_QUANT=*m*min(Arg_QP_max, EncState_QUANT);

EncState_QUANT=*m*max(Arg_QP_min, EncState_QUANT);

In summary, the rate control methods modify adjustments for the quantization parameter updates through the global_adj and EncState_QUANT variables.

Alternative rate control methods change the buffer fullness measure vbv_maxlevel in order to limiting skipping of extra input frames.

In particular, the two buffer levels are redefined as:

```
vbv_maxlevel = bits_per_input_frame * (Arg_ref_frame_rate>>10);
            // approximately 1 second of video
vbv_uselevel = bits_per_input_frame * 2;    // 2 pic typical
``` where Arg_ref_frame_rate is the input frame rate (in Q10 format, so the >>10 gets the integer part), typically about 30. Thus the alternative preferred embodiments would have a much larger vbv_maxlevel and this accommodates periodic I-frames, in that compensation for a large excess of coded bits used during I picture coding will be spread over time (thanks to vbv_converge); the goal being to avoid skipping frames to compensate from this I-frame bit excess. It is assumed here that I-frames may occur in a random manner, under the condition that a certain amount of time exists between two I-frames (order of magnitude of one second, at least).

3. QPI Increments within Frame

Preferred embodiment video rate control methods with I-frame quantization parameter adjustment are like the foregoing methods (adaptive change to QPI at the start of an I-frame) plus include possible QPI increase during an I-frame encoding. These changes allow full adaptation to random Intra picture insertions at any period of occurrence, and maintain a homogenous visual quality. The model harmonizes the quantization levels for I-frames to those used during adjacent P-frames. In addition specific controls take care, when QPI is low to avoid risk of overflow. First, the initialization of QPI for an I-frame:

```
/*** adapt Quant For next Intra
/*** try to be consistent with last P coding quality */
    QP = EncState_QUANT;
    /*** Adjust QPI depending on this I picture event */
    if (EncState_picture_coding_type == PCT_INTRA) {   //I pic
        if( bits > (2*B_target) )
            QP += (EncState_QUANT+3) >>2;
        if( bits > (4*B_target) )
            QP += (EncState_QUANT+3) >>2;
        if( bits > B_target+(B_target>>3) )
            QP += (EncState_QUANT > 6);
        if( bits < B_target-(B_target>>3) )
            QP -= (EncState_QUANT > 6);
        if( bits < B_target-(B_target>>2) )
            QP -= (EncState_QUANT+7)>>3;
        if( bits < B_target>>1 )
            QP -= (EncState_QUANT+4)>>3;
    }
    /*** To limit frame limits if next pic is I */
```

```
    if (EncState_picture_coding_type != PCT_INTRA) {
        if( QP < 4 ) QP++;
        /*** To avoid approaching vbv_maxlevel */
        if( ((bits * 8) + Vbv_level) > vbv_maxlevel )
            QP += (EncState_QUANT+7)>>3;
        /*** To avoid frame too big to occur */
        else if( (bits * 8) > frame_too_big )
            QP += (EncState_QUANT+7)>>3;
        if( (bits * 4) > frame_too_big)
            QP += (EncState_QUANT+7)>>3;
    }
    QP = (3 * QP + (Arg_QPI) + 2) / 4;    // weighted average
    // Next I pic Quant
    API_ChangeQPI( QP );
```

Thus a QPI value is calculated after each coded picture (both I- and P-pictures); and the calculation uses the currently coded picture type. The result is then used to re-initialize the Intra quantization Arg_QPI (using API_ChangeQPI) in the case the next incoming picture would be an Intra picture. This provides consistency with the QP of P-frames.

Further, the preferred embodiment methods allow for adjustment of QPI within an I-frame to avoid the following conditions:

(1) vbv overflow;
(2) high instantaneous bit rate;
(3) excessive frame skips when ratio of I-frame bits to P-frame bits is high.

Figure 1D:
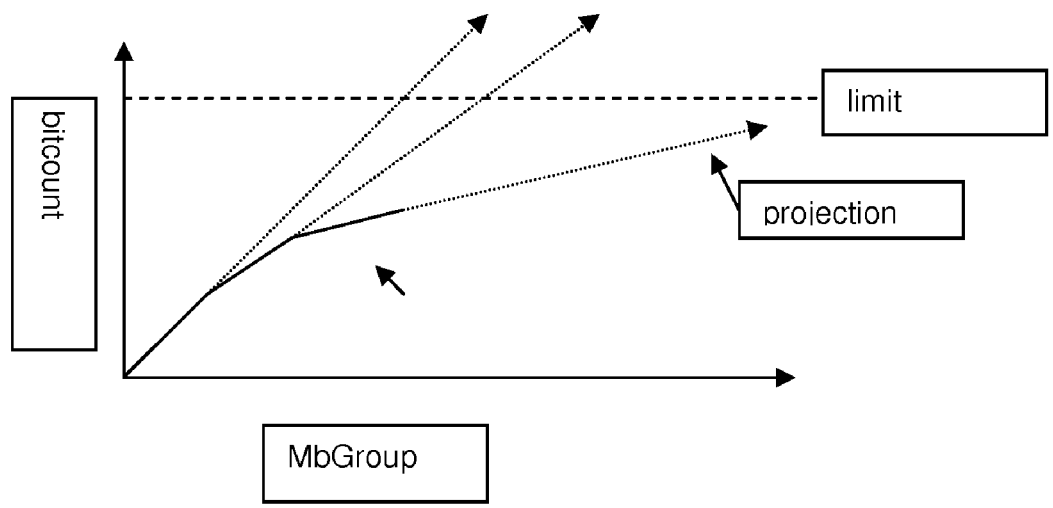

As described below, the preferred embodiment methods do not adjust (increase or decrease) to hit a bit target as illustrated in FIG. 1c, but rather increase to avoid exceeding a limit as illustrated in FIG. 1d.

In case the initial value of QPI is too low for the first I-frame, the evalMbGroupQuant ( ) is adjusted for I-frames to avoid a frame abort. In this case, QPI is raised only if it is projected that a frame abort may occur, either to avoid a vbv overflow, or to limit instantaneous bit rate.

In addition, IPratio gives a limit on the I-frame bits relative to the P-frame target number of bits. If we project that the current I-frame may exceed this ratio, we raise QPI. This is meant to reduce frame skipping. Note that for a fixed-QPI, the ratio of the I-frame bits to P-frame bits generally depends upon the bit rate and the amount of motion to be compensated. At 20 kbps for a talking head sequence, the ratio may be as high as 10, but at higher bit rates, or for more motion, the ratio may be lower. A value of IPratio=4 is typical.

The projected number of bits to be used for the frame, projection, is calculated differently for I-frames and P-frames. For a P-frame with TMN5, a uniform distribution of bits throughout a frame is assumed, and TMN5 adjusts QP to drive the partial bitcount towards this uniform distribution as illustrated in FIG. 1c. However, for I-frames, the preferred embodiments only adjust QPI such that the projected end bitcount falls under the limit (abort_limit) as illustrated in FIG. 1d. We project the bits for the entire frame by using the bits from the most recent MB group to predict the bits for remaining MB groups, and using the actual bitcounts for previous MB groups.

For simplicity, the first preferred embodiments use a fixed increment; alternatively, the increment could be proportional to the projected excess over the limit and/or could be larger closer to the end of the frame to guard against the final slice of macroblocks aborting the frame. We also want to gradually change quality, so multiple small increments in QPI are preferred to a single large increment. QPI is effectively incremented by 2 for MPEG-4 (QPI is in the range 0 to 51 for H.264, or 1 to 31 for MPEG-4). Any delQPmax limit is ignored for this case.

```
if (slice_type==TYPE_I) {
    abort_limit = min (frame_too_big - vbv_level,
                       max frame bits,
                       IbitLimit);
    bitsPerGroup = bitcount - prev_bitcount;    // delta
    projection = (numGroup - ixGroup) *bitsPerGroup + bitcount;
    if (projection > abort _limit){
        QPI += 2;
    }
```

The number of bits to abort a frame, abort_limit, is the minimum of three terms where the first term is to avoid the vbv buffer overflow of condition (1), the second term is the instantaneous bit rate limit of condition (2), and the third term reflects the bit limit of condition (3). In particular, frame_too_big-vbv_level indicates how close vbv_level is to frame_too_big which, in turn, is the buffer fullness level at which adding the maximum possible number of bits that could be used for a MB group plus the minimum number of bits for a MB times the number of remaining MBs would cause buffer overflow. And max_frame_bits is a parameter, such as 20000 bits, to help limit instantaneous bit rate. And IbitLimit=B_target*IPratio is the number of bits limit for an I-frame based on the I-frame to P-frame ratio and the average frame bit target.

Lastly, bitcount is the total number of bits used for all the prior MB groups in the frame, prev_bitcount is the total number of bits used for all the prior MB groups except the most recent MB group, numGroup is the total number of MB groups in the frame, and ixGroup is the number of the current MB group; thus projection is the total number of bits projected to be used if the remaining MB groups each uses bitsPerGroup bits.

Note that contrary to the QP for a P-frame, the preferred embodiment methods can only raise QPI and never lower it. If using a fixed QPI will not exceed any limits, then no change is made during encoding the I-frame even if very few bits are being used. In that sense, there is no target for the number of bits for the I-frame.

4. External Variable Frame Rate Adaptation

A video camera problem is that some encoder systems produce a variable frame rate. For instance, an encoder may skip a frame, due to insufficient MIPS, or some sensors change the integration time, or exposure, based on the light available. These sensors may have a target frame rate, but the actual capture time may be delayed, particularly in poor lighting conditions, or the capture may occur early. Rate control methods generally assume a fixed input frame rate to the encoder, but for a variable input frame rate, the buffer level may be different than which is assumed for fixed frame rate. Without compensating for these variations, the encoder may overflow the vbv buffer, or abort a frame unnecessarily, due to incorrect modeling of the vbv buffer. That is, even though the target output frame rate may be 15 fps, some frames may be skipped or delayed by the sensor.

Second preferred embodiment rate control methods add a routine externalSkip( ) which signals the delay (positive or negative) and adjusts the vbv_level accordingly. The routine externalSkip ( ) is called with a Q10-format delay parameter (delay in seconds*1024), and updates vbv_level.

```
// Sensor may change integration time based on light available.
// Frame capture may be delayed
void externalSkip (int vbv_level, int bit_rate, int delay){
    int bitSkip;
    // assume delay < 10 bits, bit_rate <= 22 bits
    bitSkip = (bit_rate * delay + 512)>>10;
    vbv_level -= bitSkip;
    if (vbv_level < 0){
        vbv_level = 0;
    }
}
``` where delay is in Q-10 format. For example, if target sensor output frame rate is 15 fps (66.6 msec per frame capture), and capture takes 100 msec, then the added delay is 33.3 msec and parameter delay is 0.0333*1 024=34 and bitSkip=(bit_rate*0.0333);

For variable frame rate, other methods may support added frame skips, assuming an integer number of frames are skipped. However, the second preferred embodiment methods also support sensors that may vary the capture time by fractions of the target frame time increments, with the capture occurring either early or late. For variable frame rate, this allows the encoder to run the sensor as fast as possible in low light, and still maintain a target bit rate.

When a sensor produces (or is made to produce) a variable frame rate, the system can configure an interrupt to timestamp incoming frames. The system will compute delay using the timestamps and execute externalSkip to give a better vbv_level value for encoding the frame.

5. Modifications

The preferred embodiments can be varied while retaining one or more of the features of intra quantization parameter value increase but not decrease within a picture, and/or variable input picture rate accommodated by video buffer level adjustments.

For example, the preferred embodiment methods apply to pictures generally; that is, to both interlaced (fields) as well as progressive (frames), with suitable adjustments.

The QPI increment-only methods also apply to single images, not just Intra-coded pictures in a video sequence.

Further, video or still images captured by a digital camera may be compressed (lossless or lossy) prior to temporary storage and subsequent encoding (e.g., MPEG or JPEG) in order to lessen memory bandwidth and/or temporary storage size. For example, simple pixel prediction from neighboring pixels plus variable length coding of prediction errors can provide lossless compression ratios of 2-4 when an image has little texture (i.e., good pixel prediction from neighbors). However, for images with poor pixel prediction or for larger compression ratios, quantization of the pixel prediction error can be used to decrease bit count; and this allows use of preferred embodiment methods of increasing (but not decreasing) the quantization within an image when the projected bit count exceeds a limit.

Also, Intra quantization parameter value increase within a frame may be applied starting at the same fixed QPI for every I-frame; adaptive change to QPI at the start of each I-frame is not required.

What is claimed is:

1. A method of video encoding, comprising:
 (a) providing a bit limit for intra-encoding an input picture of an input video sequence;
 (b) intra-encoding a first portion of said input picture using a first value for a quantization parameter;

(c) after (b), providing a first projection of the number of bits which will be required to complete intra-encoding of said input picture if said first value is maintained for said quantization parameter;
(d) intra-encoding a second portion of said input picture using a second value for said quantization parameter, where said second value is determined by:
   (i) when said first projection exceeds said bit limit, increasing said first value;
   (ii) when said first projection does not exceed said bit limit, maintaining said first value without any decrease regardless of the difference between said bit limit and said first projection;
(e) after (d), providing a second projection of the number of bits which will be required to complete intra-encoding of said input picture if said second value is maintained for said quantization parameter;
(f) intra-encoding a third portion of said input picture using a third value for said quantization parameter, where said third value is determined by:
   (i) when said second projection exceeds said bit limit, increasing said second value;
   (ii) when said second projection does not exceed said bit limit, maintaining said second value without any decrease regardless of the difference between said bit limit and said second projection; and
(g) after (f), intra-encoding any remaining portions of said input picture by successively repeating (f) with corresponding portions, projections, and values.

2. The method of claim 1, wherein:
(a) said first, second, and third portions are each a row of macroblocks of said input picture.

3. A method of image encoding, comprising:
(a) providing a bit limit for compression of an input picture;
(b) compressing a first portion of said input picture using a first value for a quantization parameter;
(c) after (b), providing a first projection of the number of bits which will be required to complete compression of said input picture if said first value is maintained for said quantization parameter;
(d) compressing a second portion of said input picture using a second value for said quantization parameter, where said second value is determined by:
   (i) when said first projection exceeds said bit limit, increasing said first value;
   (ii) when said first projection does not exceed said bit limit, maintaining said first value without any decrease regardless of the difference between said bit limit and said first projection;
(e) after (d), providing a second projection of the number of bits which will be required to complete compression of said input picture if said second value is maintained for said quantization parameter;
(f) compressing a third portion of said input picture using a third value for said quantization parameter, where said third value is determined by:
   (i) when said second projection exceeds said bit limit, increasing said second value;
   (ii) when said second projection does not exceed said bit limit, maintaining said second value without any decrease regardless of the difference between said bit limit and said second projection; and
(g) after (f), compressing any remaining portions of said input picture by successively repeating (f) with corresponding portions, projections, and values.

* * * * *